United States Patent [19]

Kajitani

[11] Patent Number: 4,964,201
[45] Date of Patent: Oct. 23, 1990

[54] DESCALING ABRADING APPARATUS WITH ABRADING ROLLS

[75] Inventor: Hiroshi Kajitani, Funabashi, Japan

[73] Assignee: Funayama & Co., Ltd., Tokyo, Japan

[21] Appl. No.: 492,228

[22] Filed: Mar. 13, 1990

Related U.S. Application Data

[63] Continuation of Ser. No. 74,997, Jul. 14, 1986, abandoned.

[30] Foreign Application Priority Data

Jul. 16, 1986 [JP] Japan .................................. 61-167464

[51] Int. Cl.$^5$ ............................................. B23D 79/12
[52] U.S. Cl. .................................... 29/81.03; 29/124; 29/126
[58] Field of Search .................... 29/124, 125, 126, 81; 51/74 R, 78, 206 P, 206.4; 241/235

[56] References Cited

U.S. PATENT DOCUMENTS

| | | | |
|---|---|---|---|
| 1,197,619 | 9/1916 | Fuller et al. | 51/206 P |
| 1,782,269 | 11/1930 | Marchesini | 51/78 |
| 1,988,577 | 1/1935 | Scrimgeour | 51/78 |
| 2,243,492 | 5/1941 | Wilson | 241/235 |
| 2,702,766 | 2/1955 | Weiser | 29/81 A |
| 2,953,291 | 9/1960 | Huck | 29/126 |
| 3,199,798 | 8/1965 | Turner | 241/235 |
| 3,597,881 | 8/1971 | Olton | 51/78 |
| 3,888,048 | 6/1975 | Cauffiel | 51/78 |
| 4,250,588 | 2/1981 | Cook et al. | 51/78 |
| 4,406,029 | 9/1983 | Kunz | 51/74 R |
| 4,551,878 | 11/1985 | Turley et al. | 29/81 A |

*Primary Examiner*—Howard N. Goldberg
*Assistant Examiner*—I. Cuda
*Attorney, Agent, or Firm*—Cushman, Darby & Cushman

[57] ABSTRACT

A descaling abrading apparatus with abrading rolls comprises an apparatus frame, a bearing member, and a plurality of parallel abrading rolls supported horizontally by the bearing member. Each abrading roll includes a rotating shaft, disk-shaped abrading wheels successively mounted on the rotating shaft via their corresponding collars, and spring supporters each concurrently serving as a key and disposed between their corresponding abrading wheel and their corresponding rotating shaft. The abrading wheels of one abrading roll are each located facing the collar between two corresponding adjacent abrading wheels of another adjacent abrading roll. The bearing member is supported by the apparatus frame so that it may be vertically movable with respect to the apparatus frame and so that it may be vertically downwardly pressurizable by a pressurizing means.

3 Claims, 5 Drawing Sheets

DESCALING ABRADING APPARATUS WITH ABRADING ROLLS

This is a continuation of Ser. No. 074,997, filed 07/14/86, now abandoned.

BACKGROUND OF THE INVENTION

1. Field of the Invention

The present invention relates to a descaling abrading apparatus with abrading rolls and, more particularly, to a descaling abrading apparatus with abrading rolls which is employed in a steel mill, the apparatus being adapted to exfoliate a scale (oxide film) from the surface of a steel sheet (work) and abrade the descaled surface thereof by means of abrading wheels while the abrading wheels are being under pressure rotated on the steel sheet at low speed.

2. Description of the Prior Art

Conventionally, various types of scale (oxide film) which were created on the surface of a steel sheet in, for example, a steel mill were normally removed by an acid pickling system. Recently, however, the quality of steel sheets has been enhanced, which is likely to be followed by a corresponding increase in strength or toughness of the scale. This inevitably necessitates making the acid pickling rate lower according to the type of steel. As a result, it is necessary that the descaling system be so improved as to serve the purpose in the form wherein it is directly connected to a rolling line operating at a speed higher than that corresponding to the acid pickling rate. That is, there has been an increasing demand for removal of scale with higher efficiency and a corresponding increase in the rate of feeding a steel sheet. This has raised a demand for a low-cost and high-performance descaling abrading apparatus which can be substituted for the acid pickling system or can be concurrently used together with it.

Known descaling means other than the acid pickling includes elastic abrading rolls which use felted textile or the like, belt sanders, flap-type wheels (polishing and grinding wheels), wire brushes, nylon brushes which contain abrasive grains, shot blasts, liquid hones which use powdery abrasive-grain particles, etc. These known descaling means have their respective shortcomings. That is, the elastic abrading rolls are short of abrading force. The belt sanders and flap-wheels cause excessive wear although they have moderate abrading forces. The wire brushes excessively abrade a steel sheet in regard to convex portions thereof and insufficiently abrade it in regard to concave portions thereof while, on the other hand, the wires are often broken during their use. The shot blasts are unsuitable for feeding a steel sheet at high speed. The use of the liquid hones consumes an extremely large amount of electric power. The fine powders which have been produced by means of and from the abrasive grains attach onto the surface of the steel sheet, resulting often in creation of unqualified products.

SUMMARY OF THE INVENTION

The present invention has been developed in order to overcome the above-mentioned problems inherent in the prior art and the object thereof is to provide a descaling abrading apparatus with abrading rolls, using relatively inexpensive solid disk-shaped abrading wheels which, among the abrading tools, have extremely great abrading forces and extremely large abrading ratio, the apparatus being capable of sufficiently following up the irregular surfaces of, for example, a large-width steel sheet and abrading such sheet while the abrading wheels are being in close contact therewith.

To attain the above object, according to one aspect of the present invention, there is provided a descaling abrading apparatus comprising an apparatus frame, a bearing member, and a plurality of parallel abrading rolls supported horizontally by the bearing member, the abrading rolls each including a rotating shaft, disk-shaped abrading wheels successively mounted on the rotating shaft via their corresponding collars, and spring supporters each concurrently serving as a key and disposed between their corresponding disk-shaped abrading wheel and their corresponding rotating shaft, the position of the disk-shaped abrading wheels of one of the parallel abrading rolls being made to differ from that of the disk-shaped abrading wheels of another adjacent abrading roll in such a manner that the former abrading wheels are each located facing the collar between corresponding two adjacent of the latter abrading wheels, the bearing member being supported by the apparatus frame so that it may be movable vertically of the apparatus frame and that it may be vertically downwardly pressurizable by a pressurizing means.

According to another aspect of the present invention, there is provided an abrading roll comprising a rotating shaft, a plurality of disk-shaped abrading wheels successively mounted on the rotating shaft via their corresponding collars and each formed with a shaft bore, and spring supporters each serving concurrently as a key and disposed between the rotating shaft and their corresponding concavity formed in a peripheral surface of the corresponding shaft bore.

The abrading roll is prepared such that the plurality of disk-shaped abrading wheels are mounted on the rotating shaft via their corresponding collars. The portion of the steel sheet corresponding to the collar is not abraded. Therefore, two rotating shafts are borne in parallel on the bearing member, whereby each abrading wheel on one of the two rotating shafts is located facing the position of the collar disposition on the other rotating shaft. This prevents any non-abraded portion from being left on the steel surface.

The bearing member is supported by the apparatus frame in such a manner that it is vertically movable with respect thereto. Arrangement is also made such that the bearing member can be downwardly pressurized from above. Thus, when the abrading wheels are pressurized, while they are rotated at low speed, at their position in which they can be brought into slidable contact with the surface of the steel sheet (work), the steel surface can evenly be abraded for removal of its scale.

Since the spring supporters serving concurrently as keys are interposed between the abrading wheel and the rotating shaft, the abrading wheel can without idling be rotated while it is sufficiently following up the irregular surfaces of the work.

BRIEF DESCRIPTION OF THE DRAWINGS

Embodiments of the present invention are illustrated in the drawings in which.

DESCRIPTION OF THE PREFERRED EMBODIMENTS

Figure 1:
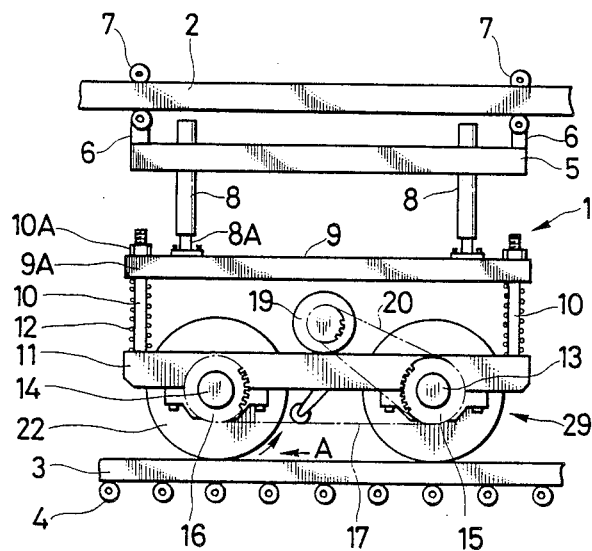
FIG. 1 is a side view of a descaling abrading apparatus.
Figure 2:
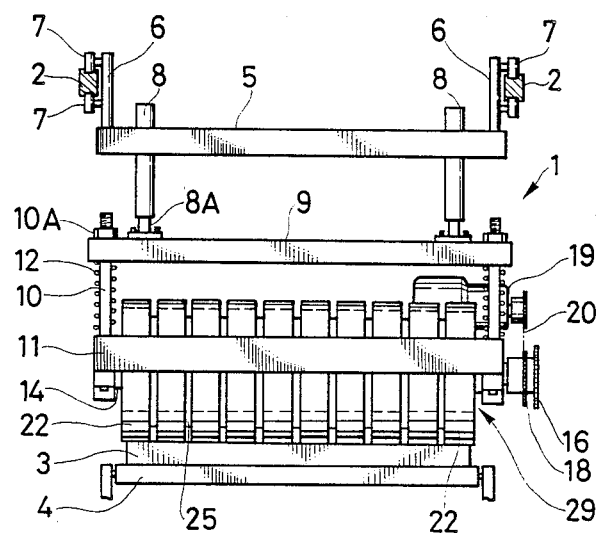
FIG. 2 is a front view of the descaling abrading apparatus.
Figure 3:
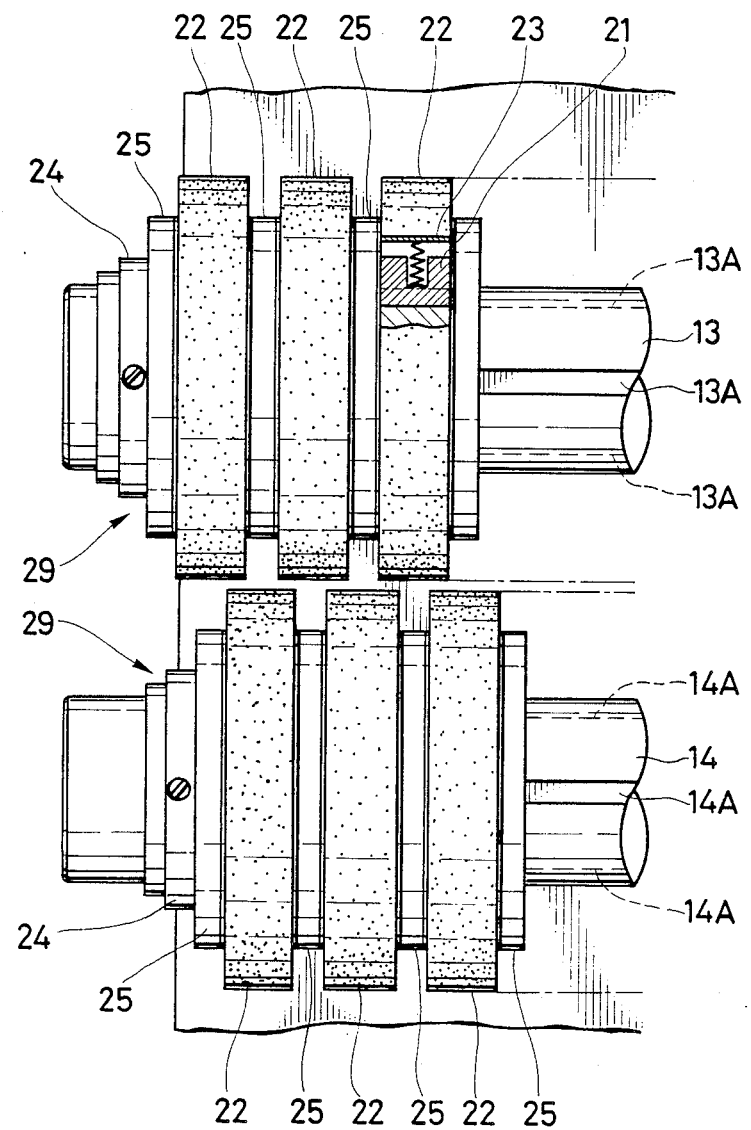
FIG. 3 is a plan view of essential portions of abrading rolls according to an embodiment of the present invention.
Figure 4:
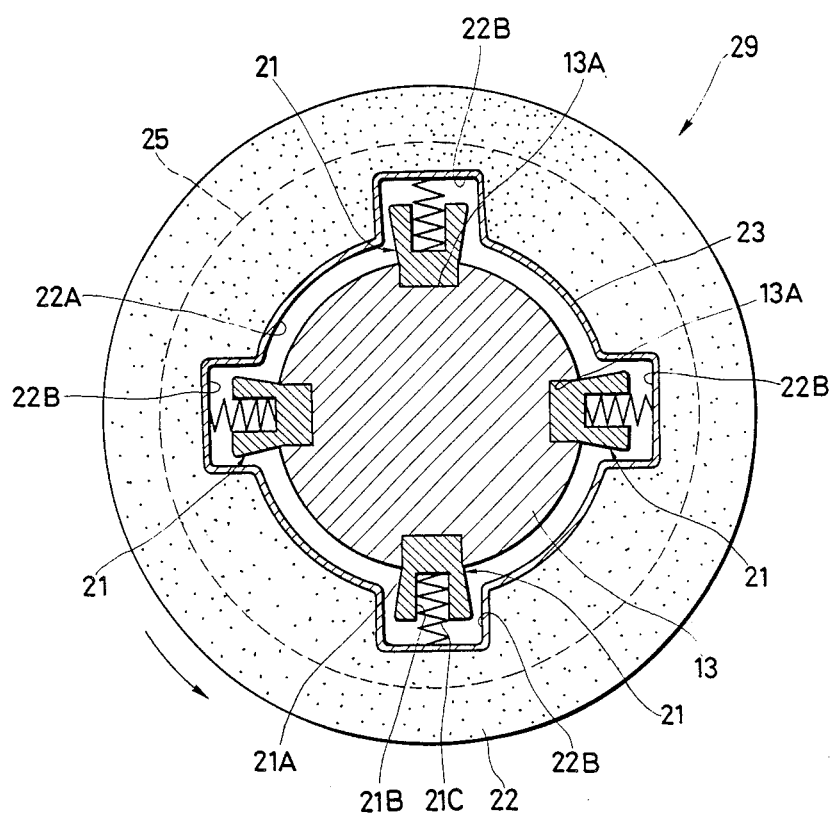
FIG. 4 is a side view of a disk-shaped abrading wheel.

An embodiment of the present invention will now be described with reference to the drawings. In the drawings, FIG. 1 is a side view of a descaling abrading apparatus; FIG. 2 is a front view thereof; FIG. 3 is a plan view of essential portions of abrading rolls; and FIG. 4 is a side view illustrating the relationship between a disk-shaped abrading wheel and spring supporters which concurrently serve as keys.

A descaling abrading apparatus 1 is suspended from a pair of overhead guide rails installed within a factory. Below the guide rails 2 is disposed a conveyance means 4 for conveying or feeding a steel sheet 3, the conveyance means 4 being intended to convey or feed the steel sheet (work) 3 at a specified speed and in a direction indicated by an arrow A.

A suspending section 5 is in the form of a square frame, at four corners of which suspending bars 6, 6 are provided in a vertically erected manner. At the upper portion of each suspending bar 6 are mounted a pair of guide wheels 7. On the other hand, the guide rails 2, 2 have an H-shaped cross section. Thus, the guide wheels 7, 7 are fitted from above and below into those concave sections of the corresponding guide rail 2, respectively, so that they may be freely slidable in the concave sections, respectively.

From the suspending section 5 are suspended a plurality of cylinders 8, 8 each having a piston rod 8A which is directed downwards and a lower end of which is fixed to a raising/lowering member 9, whereby the raising/lowering member 9 can be freely raised or lowered by operation of the plurality of cylinders 8. The raising/lowering member 9 is in the form of a square frame, at four corners of which guide bores 9A, 9A are vertically pierced through the member 9. Passed through the guide bores 9A, 9A are guide bars 10, 10, ---, respectively, onto the upper end portions of which are screwed adjusting nuts 10A, 10A so as to permit the guide bars 10, 10, --- to be vertically suspended from the square frame member 9. The guide bars 10, 10 are fixed at their lower end to a bearing member 11. Over the outer peripheral surface of each guide bar 10 is mounted a spring 12 between the raising/lowering member 9 and the bearing member 11 in a state wherein it is contracted, so as to provide a cushion.

The bearing member 11 is in the form of a square frame, by which a plurality of (two in case of the illustration) rotating shafts 13, 14 are borne horizontally in parallel with each other in a manner that they are perpendicular to the longitudinal direction of the guide rails 2. The rotating shafts 13, 14 are fixedly mounted at one end with sprockets 15, 16, respectively, over which there is stretched a timing chain 17. Another sprocket 18 is fixedly mounted on the one end of the rotating shaft 13. Over and between this third sprocket 18 and a motor 19 installed on the bearing member 11 there is stretched a chain 20 which, when the motor 19 is driven to rotate, causes the rotating shafts 13, 14 to be jointly rotated in the same direction indicated by the arrow B.

Each rotating shaft 13, 14, as shown in FIGS. 3 and 4, is longitudinally formed, in its outer peripheral surface, with key ways 13A ---, 14A ---- at four radially divided positions. Into those key ways 13A ---, 14A --- are fitted spring supporters 21, 21, --- which concurrently serve as keys.

The spring supporter 21 which serves also as the key is constructed such that its key portion 21A is in the form of a cube the axial length of which is equal to the width or thickness of an abrading wheel, the key portion 21A constituting a base portion of the spring supporter 21, the base portion being so sized as to be fitted into the corresponding key way 13A, 14A and being formed in its top with a spring hole 21B into which a spring 21C is fitted.

The abrading wheel 22 is shaped like a disk. It is formed with a shaft bore 22A in a manner that its diameter is larger than that of the rotating shaft 13, 14. The inner peripheral surface of the shaft bore 22A is formed at equal intervals with concavities 22B, 22B, ---. Over the inner surfaces of those concavities as well as the remaining inner peripheral surface of the shaft bore there is mounted an anti-friction sheet 23, which serves to prevent the spring 21C or the like from being rubbed off.

Used, in this embodiment, for the abrading wheel 22 is an abrading wheel of vitrified type # 150 having a diameter of 300 mm and a width of 1 inch. This is, however, only illustrative and not limitative.

Each rotating shaft 13, 14 is fixedly mounted, at one end, with a stopper 24. Thus, when arrangement is made such that the stopper 4 is mounted as above; a collar 25 is interposed between the adjacent abrading wheels; the key-functioning spring supporters 1 are fitted into the key ways 13A, --- 14A, ---; and the springs 21C are disposed between the bottoms of the spring holes 21B of the key-functioning spring supporters 21 and the bottoms of the concavities 22B of the abrading wheel, such a state shown in FIG. 4 is obtained wherein the abrading wheel 22 is elastically supported by the rotating shaft 13, 14. In this state, since the key portion 21A is allowed to abut against the side face of the corresponding concavity 22B, it is possible to cause the abrading wheel 22 to be reliably rotated in accordance with the rotation of the rotating shaft 13, 14. From said state, a plurality of abrading wheels 22 are further longitudinally mounted in succession on each rotating shaft 13, 14 while a collar 25 is interposed between two adjacent of the abrading wheels. As shown in FIG. 3, in this successive arrangement, the abrading wheels of the front rotating shaft 13 are displaced in position from those of the rear rotating shaft 14 in such a manner that the widthwise center of each abrading wheel of one rotating shaft 13 or 14 opposes the widthwise center of the corresponding collar of the other rotating shaft 13 or 14. This is for the purpose of zeroing any non-abraded portion which would otherwise be produced on the surface of the work. The rotating shaft 13 or 14, collars 25, abrading wheels 22, and key-functioning spring supporters 21 constitute one abrading roll 29. This abrading roll 29 may be increased or decreased in length according to the axial length of the corresponding rotating shaft. Further, when the work is abraded while it is moved in a state of having been horizontally obliquely laid with respect to the longitudinal direction of the rotating shaft 13, it can be abraded even by one unit of abrading roll 29 without having any non-abraded portion left thereon.

In operation, the work (steel sheet) 3 is fed by the conveyance means 4 at a feeding speed of 150 mpm and in the direction indicated in FIG. 1 by the arrow A, while, on the other hand, the raising/lowering member 9 is lowered by the action of cylinder 8. The work 3 is pressurized in a state wherein it is contacted by the lower ends of the abrading wheels 22. The circumferential velocity of the abrading wheels 22 is set to be 600 mpm while the pressurization thereof is controlled so that one ampere of load per inch is applied. The circumferential velocity preferably is set to fall within the range of from about 500 to about 800 mpm.

A cooling water is sprayed over the surface of the work 3 at a rate of 12 liters per minute.

Whereby, the scale on the surface of the work 3 can be removed in an amount corresponding to a thickness of about 12 to 13 microns.

Figure 5:
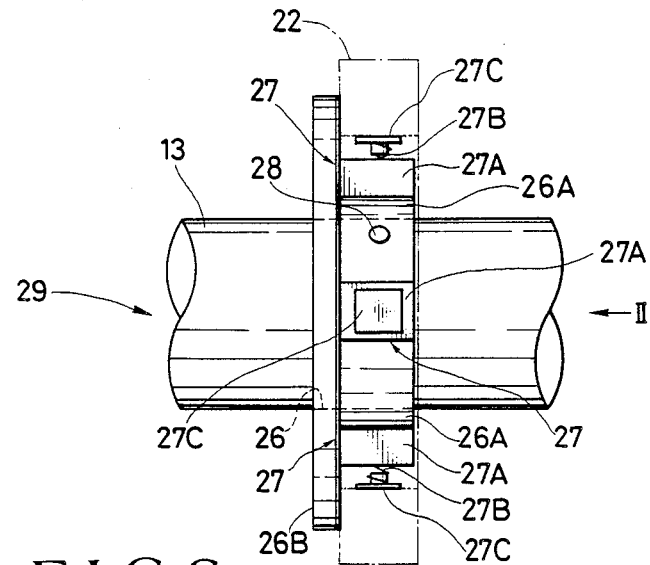
FIG. 5 is a plan view of an essential portion of an abrading roll according to another embodiment of the present invention.
Figure 6:
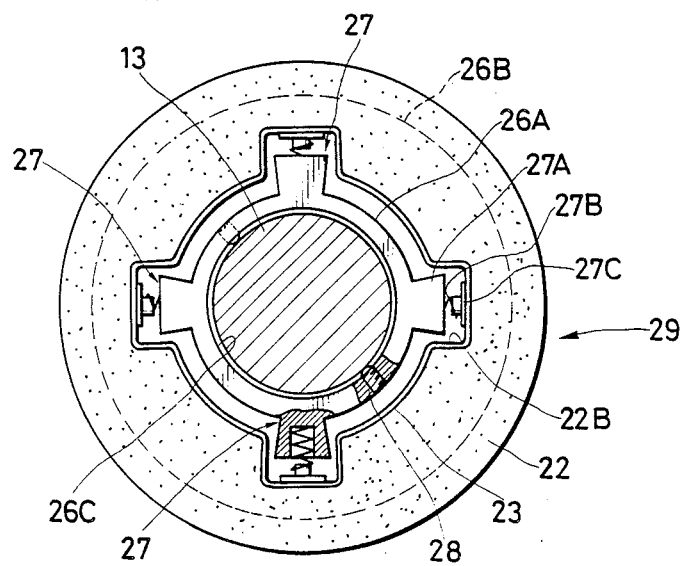
FIG. 6 is a view taken from the direction indicated by an arrow II of FIG. 5.

The present invention is not limited to the above-mentioned embodiment. FIGS. 5 and 6 illustrate a collar made integral with a key-functioning spring supporter. The collar 26 has a cylindrical portion 26A one end opening portion of which is formed with a flange 26B at its outer peripheral surface and from the remaining outer peripheral surface portion of which key-functioning spring supporters are radially outwardly projected at circumferentially equidistantly spaced positions. Each spring supporter 27 has a key-functioning portion 27A, the radially outward end face of which is fixedly mounted with a spring 27B in a manner that this spring 27B is radially expanded or contracted, the spring 27B being fixedly mounted at its radially outer end with a washer 27C.

Over the outer peripheral surface of the cylindrical portion 26A there is fitted the abrading wheel 22 so that the washers 27C, 27C, --- may be located at the bottoms of the concavities 22B of the wheel 22.

Thus, the abrading wheel 22 is elastically supported by the cylindrical portion 26A of the collar 26 in a state wherein it is located coaxially with respect thereto. Thus, when the collar 26 is rotated, the key-functioning portions 27A of the spring supporters 27 are allowed to abut against the side faces of the concavities 22B of the abrading wheel 22, whereby the abrading wheel 22 is kept to be rotated in accordance with the rotation of the collar.

When, under this condition, a shaft bore 26C of the collar 26 is fitted over the rotating shaft 13, 14 and the collar 26 is fixed onto the outer peripheral surface of the same by means of lock pins 28, it is possible to cause the abrading wheel 22 to be rotated by the rotating shaft 13, 14.

Figure 7:
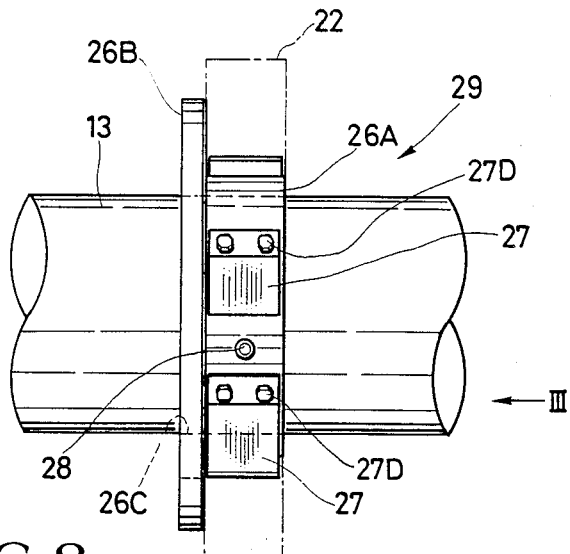
FIG. 7 is a plan view of an essential portion of an abrading roll according to still another embodiment of the present invention.
Figure 8:
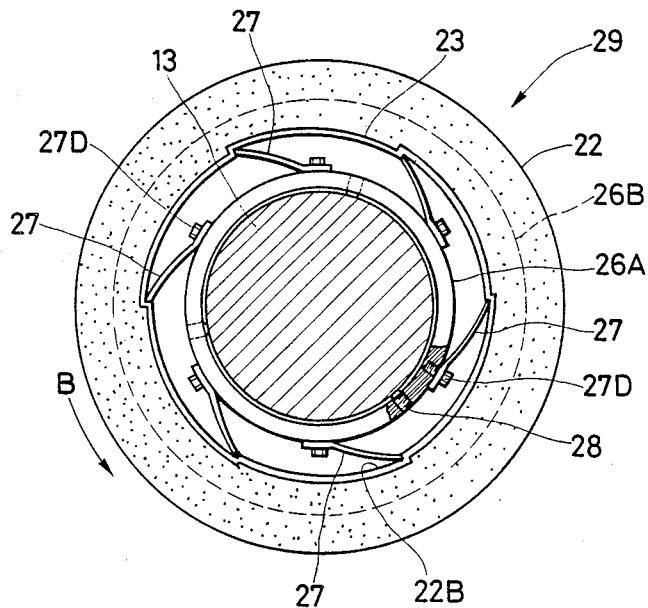
FIG. 8 is a view taken from the direction indicated by an arrow III of FIG. 7.

FIGS. 7 and 8 illustrate a collar according to still another embodiment of the invention. The same portions, or the portions or members having the same functions, as those associated with the collar 26 and described in connection with the preceding embodiment are denoted by like reference numerals. In this embodiment, leaf springs are substituted for the key-functioning spring supporters 27. The leaf spring has a base end portion which is fixed, by means of a setscrews 27D, to the outer peripheral surface of the cylindrical portion 26A of the collar 26. A tip end portion of the leaf spring 27 is directed in the rotational direction of the collar 26 while that tip end portion is spaced away from the outer peripheral surface of the cylindrical portion 26A. In this state, a plurality of (six in case of the illustration) the leaf springs 27 are mounted on the outer peripheral surface of the cylindrical portion 26A at circumferentially equidistantly spaced positions thereof. When the abrading wheel 22 is fitted over the outer peripheral surface of the cylindrical portion 26A having the described construction so as to permit the tip end portions of the leaf springs 27 to be fitted into the concavities 22B respectively, then the abrading wheel 22 is elastically supported by the cylindrical portion 26A while it is located coaxially with respect thereto. In FIG. 8, when the rotating shaft 13 is rotated in the direction indicated by an arrow B, the abrading wheel 22 is rotated jointly therewith.

As stated above, the abrading roll 29 according to the present invention is constructed such that a plurality of disk-shaped abrading wheels 22 are successively mounted on one rotating shaft via the collars interposed therebetween. In addition, the key-functioning spring supporters are interposed between the abrading wheel and the rotating shaft. Therefore, it is possible to cause the abrading wheels to be rotated jointly with the rotating shaft. Besides, since the abrading roll 29 has the cushioning function, it is possible to cause the abrading wheels to sufficiently follow up the irregular surfaces of the work during their sliding contact with the same. Furthermore, because of said cushioning function, it is also possible to absorb the shocks involved and, hence, prevent the surface of the work from being damaged or impaired due to such shocks. Particularly, in view of the fact that during the low-speed rotation of the abrading roll the descaling is more conveniently effected when the work is pressurized, provision of the cushions between the rotating shaft and the abrading wheels is effective.

Furthermore, in the present descaling abrading apparatus 1, not only is the bearing member pressurized toward the work but each abrading wheel can independently be vertically movable relative to the rotating shaft owing to its mentioned cushioning function. Therefore, the abrading wheel can during its operation be kept in elastic close contact with the irregular surfaces of the work. Thus, the apparatus can have the great capability of following up with the surface of the work. This makes it possible to effect a continuous abrasion of a large-width sheet of steel.

The scale on a steel sheet is harder but is more brittle than the material which constitutes the steel sheet. Therefore, the scale can more easily be abraded for removal by a low-speed/under-pressure rotation of the abrading wheels than the steel material having high toughness. Since the abrading wheel has an extremely great abrading or grinding force, it can exfoliate hard and rigid scale as well from the surface of the steel. Further, it is also possible to abrade the work while passing the same at high speed, by selecting the type of the abrading wheel.

Further, during the work abrading operation, chattering is less likely to occur since various vibrations are absorbed by the key-functioning spring supporters.

In the present descaling abrading apparatus, the axial end portion of one preceding abrading wheel and the corresponding axial end portion of another succeeding abrading wheel, in duplication, abrade the same portion of the work surface, so that fine lines of duplicate abrasion which are so-called "section lines" are created in the surface of the work. In case of, for example, steel sheets which are to be descaled, most of them are usually subjected to rolling after their descaling. Therefore, no practical problem arises from the presence of such fine section lines. Further, with respect to most of various steel sheets which are subjected to no fabrication, the present apparatus is also applicable unless it is intended to provide a finished abrasion surface required to impart a feeling of beauty.

To say further about the descaling of steel sheet, since the scale thereon is more brittle than the steel material, it is easy to remove by abrasion. This means that it is possible to descale the steel sheet while suppressing the abrasion of the tough material thereof. This in turn means that the extent to which the above-mentioned section lines are created remains to be very small. In case of the descaling, the selective use of abrasive grains having a size of about # 150 to about # 280 would make it possible to descale the object steel sheet to obtain a good abraded surface thereof.

An ampere sensor is connected to the above-mentioned motor while on the other hand, an automatic pressurization controlling device is installed which is intended to control the rotations of that motor and a hydraulic motor for the previously mentioned cylinders in accordance with the variations in ampere.

By so doing, it is possible to maintain the ampere of the motor to be constant, thereby permitting the pressurization from the abrading wheels onto the surface of the work to be so maintained as to provide a specified level of pressure.

The descaling abrading apparatus of the present invention has the following excellent effects.

(A) The abrading wheels are under pressure maintained in contact with the surface of the work while they are rotated at low speed and while the pressurization is suppressed to a minimum level of pressure capable of effecting the abrasion. Therefore, the present apparatus can have not only a high degree of durability but also a high economicalness even in the case of passing the work at high speed.

(B) The present apparatus is simple in structure and in addition the abrading wheel thereof is relatively inexpensive Thus, the apparatus can be manufactured at a much lower cost than the old relevant apparatus and in addition is easy to maintain and control.

(C) The abrading roll of the present apparatus is constructed such that the key-functioning spring supporters are interposed between the rotating shaft and the abrading wheel. The abrading wheel can therefore be rotated with high reliability. In addition, each abrading wheel has its own independent cushioning function which is exhibited vertically of the apparatus frame. It can therefore sufficiently follow up the irregular surfaces of the work and, on the other hand, absorb the vibrations involved. Thus, the use of the present apparatus makes it possible to obtain a good abrasion.

What is claimed is:

1. A descaling abrading apparatus comprising an apparatus frame, a bearing member, and a plurality of parallel abrading rolls borne horizontally by said bearing member, said abrading rolls each including a rotating shaft, disk-shaped abrading wheels successively mounted on said rotating shaft by means of a respective collar, and spring supporters each serving concurrently as a key and each disposed between one of said disk-shaped abrading wheels and said rotating shaft, the position of said disk-shaped abrading wheels of one of said parallel abrading rolls being offset from that of said disk-shaped abrading wheels of another, adjacent abrading roll so that the abrading wheels of the former are each in facing relation to a portion intermediate adjacent abrading wheels of the latter, said bearing member being supported by said apparatus frame so that said bearing member is movable vertically relative to said apparatus frame and said apparatus further comprising a pressurizing means for vertically downwardly pressurizing said bearing member.

2. An abrading roll comprising a rotating shaft, a plurality of disk shaped abrading wheels successively mounted on said rotating shaft via corresponding collars and each formed with a shaft bore sized so that a circumferential clearance is defined between said disk shaped abrading wheel and said shaft, and spring supporters extending outwardly from said shaft into said clearance and into a respective concavity formed in a peripheral surface of said shaft bore whereby said spring supporters each serve concurrently as a key, said spring supporters circumferentially urging the entire abrading wheel outwardly from the shaft.

3. An abrading roll according to claim 2, wherein said collars are each formed with a flange portion on one end portion of an outer peripheral surface of an annular wall thereof, and are formed, on the remaining portion of said outer peripheral surface, with said key-functioning spring supporters in such a manner that said key functioning spring supporters are radially projected therefrom at circumferentially equidistantly spaced positions.

* * * * *

UNITED STATES PATENT AND TRADEMARK OFFICE
CERTIFICATE OF CORRECTION

PATENT NO. : 4,964,201

DATED : October 23, 1990

INVENTOR(S) : KAJITANI

It is certified that error appears in the above-identified patent and that said Letters Patent is hereby corrected as shown below:

ON TITLE PAGE:

Item [73] Assignee: change "Funayama & Co., Ltd." to
-- Mr. Hiroshi Kajitani and Mr. Kenjin Funayama --

Signed and Sealed this

Fifteenth Day of September, 1992

Attest:

DOUGLAS B. COMER

*Attesting Officer*  *Acting Commissioner of Patents and Trademarks*